Nov. 18, 1930.  W. E. GIESECKE  1,781,838
MACHINE AND PROCESS FOR CRACKING NUTS
Filed Nov. 12, 1927  2 Sheets-Sheet 1
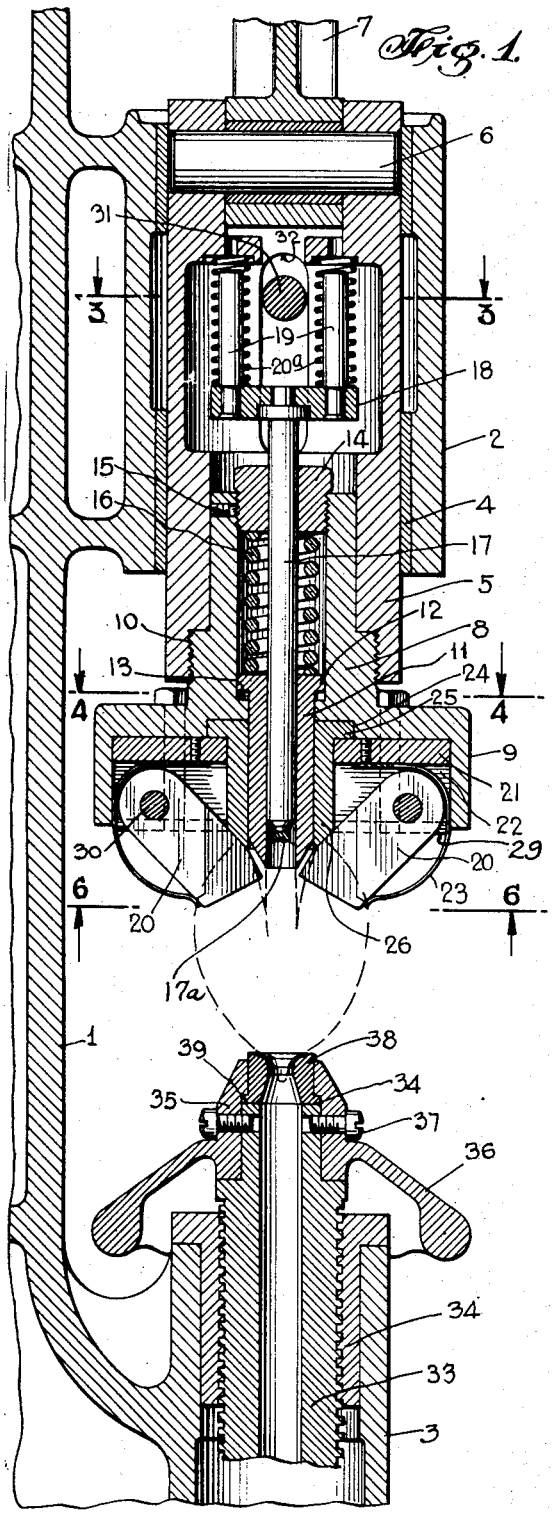
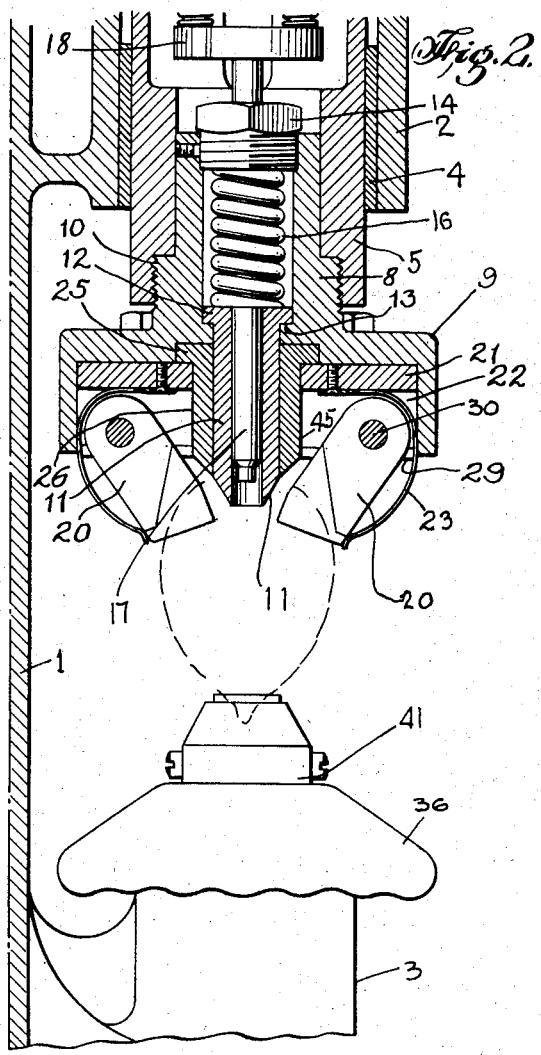
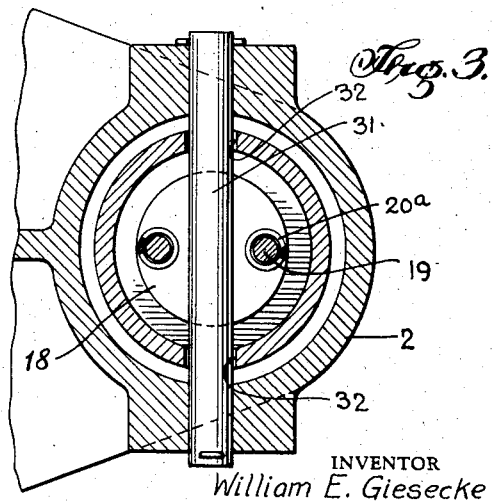
INVENTOR
William E. Giesecke
BY
Meyers & Jones
ATTORNEYS Nov. 18, 1930.   W. E. GIESECKE   1,781,838
MACHINE AND PROCESS FOR CRACKING NUTS
Filed Nov. 12, 1927   2 Sheets-Sheet 2

INVENTOR
William E. Giesecke
BY
Meyers & Jones
ATTORNEYS.

Patented Nov. 18, 1930

1,781,838

UNITED STATES PATENT OFFICE

WILLIAM E. GIESECKE, OF NEW YORK, N. Y., ASSIGNOR TO CHARLES T. WILSON COMPANY, INC., OF NEW YORK, N. Y., A CORPORATION OF NEW YORK

MACHINE AND PROCESS FOR CRACKING NUTS

Application filed November 12, 1927. Serial No. 232,842.

This invention is an improvement in methods and machines for cracking nuts, and more particularly in a method of and a machine for cracking nuts of the babassu type, to lessen breaking the kernels thereof.

In the usual method of cracking nuts of the babassu type, which as previously pointed out have a central column of dense relatively resistant material, the nut is compressed along its longitudinal axis, while at the same time it is split radially from one or both ends on lines substantially parallel with the axis of the nut. That is, the intention is to break or crush the central column or mast, while splitting the nut wall.

Because of this manner of cracking the nut, the kernels are frequently broken or shivered, because of the internal pressure exerted by the bursting column, which forces the kernel toward the outer retaining wall, before the wall has been sufficiently broken to offer a lessened resistance to the movement of the kernel.

By the present method, the nut is held by pressure at the ends of the long axis thereof during the initial part of the splitting of the outer nut wall, and no crushing action is exerted on the central mast or column until near or at the end of the splitting operation, so that when the column breaks or bursts the nut kernels are not constrained against outward movement by an unyielding unbroken or unsufficiently broken wall. Hence, a greatly lessened resistance is offered to the outward displacement of the kernel, and there is less breakage.

In splitting the nut with the type of cutter head shown in my prior application No. 172,-422, by means of which in connection with the machine with which it is used, the method above described may be carried out, the cutters or blades of the cutterhead are pivotally mounted to swing radially with respect to the axis of the nut during the cutting operation. By this method of mounting certain valuable ends are attained.

However, blades so mounted, and having a limited swinging movement, do not readily release the nut after it has been cracked under the impulse of the dislodging mechanism for the same.

One of the primary objects of the present invention is the provision of a method for substantially eliminating liability to breakage of the nut kernel, by substantially eliminating resistance to the movement of the kernels, when they are moved under the urge of the cracking operation.

Another object is the provision of an improved machine for carrying out the method in an efficient and economical manner.

Another object is the provision in such a machine of a type of cutterhead enabling quick and ready adjustment for different types of nut and enabling also ready removal and replacement of a damaged blade.

Another object is the provision in such mechanism of means facilitating the release of the cracked nuts from the cutterhead.

Another object is the provision in such a machine of mechanism operating positively to discharge the nut from the cutterhead immediately at the end of the cracking operation.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof:—

Fig. 1 is a vertical section through the operating parts of the improved machine.

Fig. 2 is a similar view showing the parts in another position.

Figure 4:
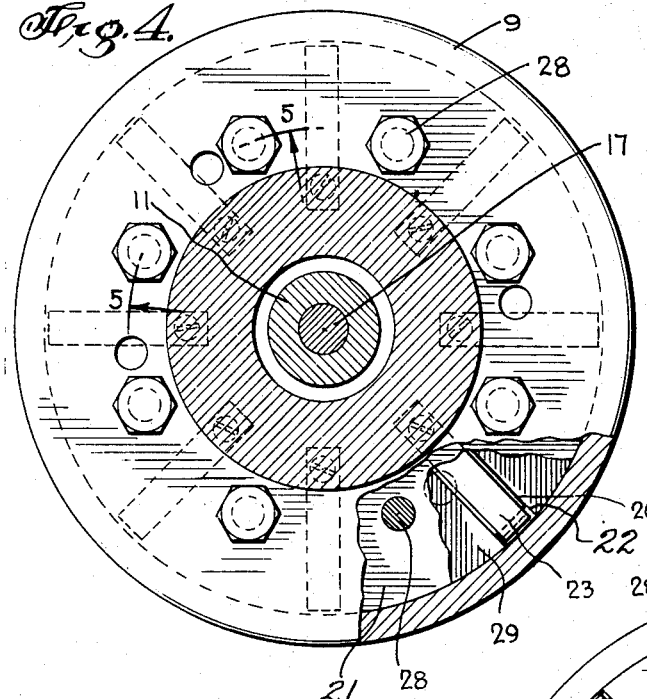
Figure 6:
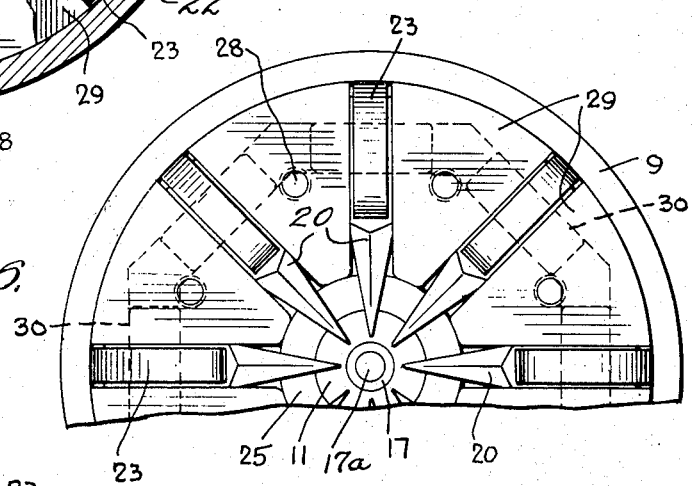

Figs. 3, 4 and 6 are sections on the lines 3—3, 4—4 and 6—6 respectively, of Fig. 1.

Figure 5:
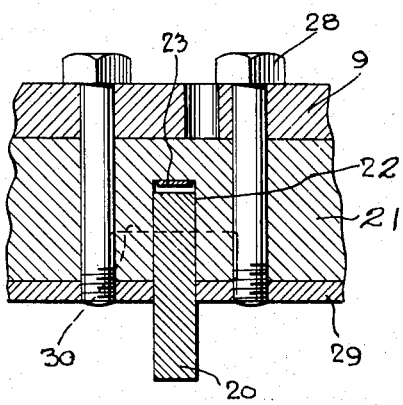

Fig. 5 is a section on the line 5—5 of Fig. 4.

Figure 7:
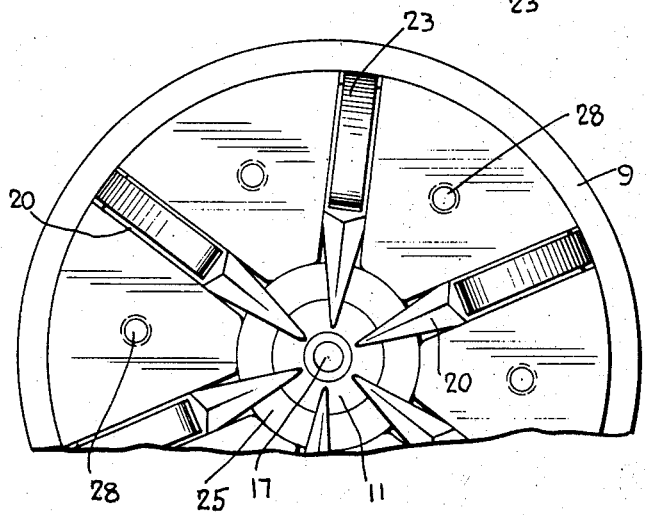

Fig. 7 shows a different assembly of blades.

The construction of the present application, which is a continuation in part of my prior application Serial No. 172,422, filed March 3, 1927, on a nut cracking machine, includes a frame 1 of suitable construction, having vertically spaced coaxial sleeves 2 and 3, the former being designed to support respectively the cutter head and the anvil cooperating therewith in the cracking of the nut, both of which, the head and the anvil will be later described in detail.

A bushing 4 is mounted in the sleeve 2, and a piston 5 is arranged within the bushing. This piston has connected with the upper end thereof by means of a crank pin 6, operating mechanism indicated generally at 7, for reciprocating the piston. The piston is chambered axially, and within the lower end thereof there is arranged the hub 8 of a head 9 which carries the cutter blades. This head is inverted cup shaped, as shown, and the hub is externally threaded to threadedly engage within the piston, the engagement being indicated at 10. Within the hub and axially of the piston is slidably mounted a core cutter 11, in the form of a sleeve having its lower end beveled to provide a cutter. The upper end of the core cutter is annularly flanged at 12, and the bore of the hub is enlarged to receive the flange, which thus by its engagement with the annular shoulder 13 formed between the enlarged portion and the normal bore of the hub limits the downward movement of the core cutter and prevents disengagement thereof from the hub.

A nut 14 is threaded into the upper end of the bore of the hub, being held locked in adjusted position by a set screw 15, and a coil spring 16 is arranged between the nut and the upper end of the core cutter, the spring acting normally to press the core cutter downward, whereby to cause the flange 12 to engage the shoulder 13. In order to remove the core cutter from the hub, the head is unscrewed from the piston, after which the nut 14 may be released and removed. The spring 16 and the core cutter are then movable upwardly out of the hub.

A knockout pin 17 is movable axially through the core cutter, and the pin is connected at its upper end to a plate 18 movable in the axial chamber of the piston. A pair of pins 19 is connected with the plate, and extend upwardly therefrom, and each pin is encircled by a coil spring 20$^a$. The lower end of each spring bears against the plate, while the upper end bears against the piston, the springs acting normally to hold the knockout pin in its lowermost position.

The cutter assembly includes the head 9, a plurality of blades 20, a disk 21, and a plurality of holding plates 29. The disk 21 is seated in the head, and it has a central opening through which passes the core cutter guide 26. The head is annularly recessed at its axis, as shown at 24, and the core cutter guide has an annular flange 25 at its inner end, which fits within the recess 24. The body of the guide extends through the central opening of the disk 21, and the guide is held in place by the disk, which engages over the flange 25 as shown in Fig. 1.

The other or lower end of the core cutter guide extends slightly below the rim of the cup shaped head, and is beveled as shown, the bevel corresponding approximately to that of the end of the core cutter. The blades 20 which are of the shape shown in Figures 1, 6 and 7, may vary in number in accordance with the type of nut to be cracked. In Fig. 6 an assembly of eight blades is shown, while in Fig. 7 the assembly includes six blades. The blades are received in radial recesses 22 in the disk, and each blade has a transverse pivot 30, the ends of which seat in open notches, as shown, in the lower face of the disk 21, a notch being arranged on each side of each recess 24.

The notches are open at the lower face of the disk, and a holding plate 29 is arranged between each pair of adjacent blades, over the notches, thus to pivotally connect the blades to the disk. The plates and the disk are held in place in the head by means of screws 28, a screw being provided between each pair of blades. The screws pass through openings in the heads, and through registering openings in the disk, and engage threaded openings in the holding plates.

The pivotal mounting of the blades is such that they would normally depend from the pivots, but each blade is supported by a spring 23 in approximately the position of Fig. 1, that is inclining inwardly and downwardly at an angle of about 45°. The springs are connected to the disk 21 as shown, and act to return the blades to the position of Fig. 1, when they are pulled downward by the discharging nut, and to hold them in this normal position.

Under normal conditions the springs 20$^a$ have sufficient strength to operate the knockout pin to discharge the cracked nut from the cutters, but mechanism is provided for making the action of the pin positive. Such mechanism includes a cross pin 31, which extends through oppositely arranged vertical slots 32 in the piston, the ends of the pin being held by the sleeve 2. The slots are of a length to enable the piston to move freely throughout the extent of its movement, but the pin is so positioned that near the end of the upward movement of the piston, it will engage the plate 18, and will move said plate and the knockout pin downward, thus positively discharging the nut. It will be noticed that the lower end of the knockout pin is reduced as shown at 17$^a$.

The anvil includes a tubular shank 33 which has threaded engagement with a bushing 34 held in the sleeve 3. The threaded connection between the bushing and the shank is coarse, to enable quick adjustment of the parts, and the upper end of the shank is reduced, to fit within a hub 35, having a downwardly and outwardly inclining flange 36 acting as a deflector for the cracked nuts, and as a handle for turning the shank. The hub is secured to the shank by means of set screws 37, and a ring 38 is rotatably mounted in the upper end of the hub. The ring as shown has an annular flange 39 at its lower end which fits between the upper end of the shank and the hub to rotatably connect the ring to the hub.

In operation the cutter assembly has knives or blades in accordance with the type of nut being operated upon. When the nut has a single kernel, two knives or three are enough. When there are three kernels, more blades are required, and the number of blades will be in accordance with the number of kernels in the nut. The ring 38 provides a seat for the pointed end of the nut, and the shape of the blades is such that they cooperate to provide a seat for the butt or acorn end of the nut. The anvil is adjusted roughly toward the head in accordance with the prevailing size of nut, and when once adjusted, is not changed unless there is a divergence from the prevailing average size.

In practice, the head is reciprocated at regular intervals, and with each reciprocation, a nut is placed with the pointed end thereof in the ring 38, and with the acorn end bearing against the blades. As the cutter head moves downward, the wedge-shaped blades cut and split the outer wall of the nut on lines following substantially the long axis thereof. The core cutter can, however, move upwardly because of the spring 16, so that the central column which is of dense resistant material is held intact until the nut has been split upon lines in accordance with the number of blades almost the full length thereof. This rupture of the outer wall eliminates or greatly lessens the resistance to outward movement of the kernels when the central column is broken. As the splitting by the blades 20 is substantially complete, the central column is smashed, thus completely releasing all of the kernels.

It is obvious that the thorough cracking of the nut so as to release all of the kernels is not always dependent upon breakage of the central column. The column may be intact at the end of the cracking operation, this depending upon the resistance of the spring 16, and the distance which the core cutter may travel in the piston.

As the cutterhead moves upward, the knockout pin as well as the core cutter operate to release the nut from the blades. The core cutter is held downward or moved downward by the spring 16 and the knockout pins by the springs 20. The blades are free to swing under the weight of the nut and the impulse of the springs, and as the points of the blades move outward, the distance between them increases, thus entirely releasing the nut, so that it may fall from the machine.

The arrangement of the cutter head is such that an eight blade head for instance may be easily converted into a four or a two blade head, in the former instance by removing the alternate blades and in the latter by removing all but a pair of opposite blades. Likewise, a six blade head may be converted into a three blade head by removing the alternate blades. This is permitted by releasing the screws 28 holding the spacing blocks of the alternate blades, it being understood that the cutter head is first removed from the piston and preferably inverted. When the retaining or holding plates 29 at opposite sides of the alternate blades are released, the blades may be lifted out, and the holding plates again secured in place. Thus the intermediate blades are firmly held, with the alternate blades removed.

It will be understood that it is not essential in the cracking of the nut to break the central column. The acorn end of the column is segregated at about the same time as the splitting of the outer wall commences. The segregation of the central column by the core cutter facilitates the splitting operation of the blades, and the cracking need not necessarily be carried so far as smashing of the central column, although usually this results. It is, however, retained intact until the splitting operation is substantially complete.

What is claimed as new is:—

1. The method of cracking nuts with a central resistance column, which consists in supporting the nut by grasping it at the ends of the column, and simultaneously segregating one end of the central column and splitting the outer wall of the nut from the segregated end of the column toward the other end.

2. The method of cracking nuts with a central resistant column, which consists in supporting the nut by grasping it at the ends of the column, and simultaneously segregating one end of the central column and splitting the outer wall of the nut from the segregated end of the column toward the other end over a plurality of lines.

3. The method of cracking nuts with a central resistant column, which consists in engaging the nut at the ends of the column by cracking means to support the same, segregating one end of the central column, and splitting the outer nut wall from the segregated column end, and afterwards exerting pressure on the ends of the column to rupture the same.

4. In apparatus for cracking nuts, including an anvil, and a cutter head cooperating therewith, said head having radial blades pivoted to enable them to swing into substantially vertical position, springs normally holding the blades inclining inwardly and downwardly in converging relation, and a tubular core cutter carried by the head having its cutting end substantially in the plane of convergence of the blades.

5. In apparatus for cracking nuts, including an anvil, and a cutter head cooperating therewith, said head having radial blades pivoted to enable them to swing into substantially vertical position, springs normally holding the blades inclining inwardly and downwardly in converging relation, and a tubular core cutter carried by the head having its cutting end substantially in the plane of convergence of the blades, said core cutter spring mounted to enable it to yield under the pressure of the nut, thereby to retain the core intact until at or near the end of the splitting operation.

6. In apparatus for cracking nuts, including an anvil, and a cutter head cooperating therewith, said head having radial blades pivoted to enable them to swing into substantially vertical position, springs normally holding the blades inclining inwardly and downwardly in converging relation, a tubular core cutter carried by the head having its cutting end substantially in the plane of convergence of the blades, and a knockout pin for removing the core from the cutter yieldingly pressed in a direction to discharge the core.

7. In apparatus for cracking nuts, including an anvil, and a cutter head cooperating therewith, said head having radial blades pivoted to enable them to swing into substantially vertical position, springs normally holding the blades inclining inwardly and downwardly in converging relation, a tubular core cutter carried by the head having its cutting end substantially in the plane of convergence of the blades, a knockout pin for removing the core from the cutter yieldingly pressed in a direction to discharge the core, the head and anvil mounted for relative reciprocating movement, and means operated by the movement of said elements away from each other to positively move the knockout pin toward the anvil near the end of the separating movement.

8. In apparatus for cracking nuts, including an anvil, and a cutter head cooperating therewith, said head having radial blades pivoted to enable them to swing into substantially vertical position, springs normally holding the blades inclining inwardly and downwardly in converging relation, and a tubular core cutter carried by the head having its cutting end substantially in the plane of convergence of the blades, said core cutter spring mounted to enable it to yield under the pressure of the nut, thereby to retain the core intact until at or near the end of the splitting operation, the core cutter and the blades having cooperating surfaces to swing the blades outwardly and downwardly when the cutter is moved by the spring.

9. In apparatus for cracking nuts, including an anvil, and a cutter head cooperating therewith, said head having radial blades pivoted to enable them to swing into substantially vertical position, springs normally holding the blades inclining inwardly and downwardly in converging relation, a tubular core cutter carried by the head having its cutting end substantially in the plane of convergence of the blades, a knockout pin for removing the core from the cutter yieldingly pressed in a direction to discharge the core, the head and anvil mounted for relative reciprocating movement, and means operated by the movement of said elements away from each other to positively move the knockout pin toward the anvil near the end of the separating movement, the core cutter and the blades having cooperating cam surfaces to move the blades outwardly and downwardly when the core cutter is so moved.

10. In apparatus for cracking nuts, a substantially cup shaped cutter head, a plurality of blades, and means for mounting the blades in the head in radial relation, including a disk fitting within the head and having radial slots for the blades, each blade having a transverse pivot, and the disk having open notches at the opposite sides of the slots to receive the ends of the pivot, and holding plates fitting the disk between the blades and detachably connected with the head.

11. In apparatus for cracking nuts, a substantially cup shaped cutter head, a plurality of blades, and means for mounting the blades in the head in radial relation, including a disk fitting within the head and having radial slots for the blades, each blade having a transverse pivot, and the disk having open notches at the opposite sides of the slots to receive the ends of the pivot, and holding plates fitting the disk between the blades and detachably connected with the head, said connection including registering openings in the head, the disk and the plates, and screws passing through the head and disk and having threaded engagement with the plates.

12. The method of cracking babassu nuts having a resistant central column, which consists in engaging the nut at the ends of the central mast of column to support the same, and splitting the outer wall over a plurality of lines extending longitudinally of the axis while the nut is so held, and afterwards exerting cracking pressure upon the central column.

Signed at New York, in the county of New York and State of New York, this 21st day of October A. D. 1927.

WILLIAM E. GIESECKE.